United States Patent Office 3,573,907

Patented Apr. 6, 1971

3,573,907

PROCESS FOR MAKING ETCHING RESISTS AND PHOTOGRAPHIC STRIPPING FILM FOR USE IN SUCH PROCESS

Johan Lodewijk Verelst and Albert August Reyniers, Kontich, Belgium, assignors to Gevaert-Agfa N.V., Mortsel, Belgium No Drawing. Filed Dec. 9, 1966, Ser. No. 600,375
Claims priority, application Great Britain, Dec. 9, 1965, 52,372/65
Int. Cl. G03c *1/90, 11/12*
U.S. Cl. 96—28 13 Claims

ABSTRACT OF THE DISCLOSURE

An etching resist on a metallic surface to be etched is produced by means of a photographic stripping film which includes directly attached to the film support a layer essentially consisting of hydrophilic colloid and a synthetic polymeric material which has been mixed as a latex with the hydrophilic colloid, which layer is at least water-permeable, if not warm water soluble. After the film is exposed and a hardened relief image is produced, the metallic surface is wet with a liquid which has a swelling action for hydrophilic colloids less than that of pure water. The film is applied to the wet metal surface, the film support is removed by stripping and the remainder of the film is developed to produce a hardened, water-insoluble relief image which is then finally dried. In one embodiment an unhardened, light-sensitive layer, soluble in warm water, is provided on a separate colloid-latex layer, the light-sensitive layer being adapted to form a hardened water-insoluble relief image, there being no anchor remaining insoluble in warm water formed between the light-sensitive layer when in hardened condition and the colloid-latex layer, at least if the latter layer is insoluble in warm water. In another embodiment, the colloid-latex layer itself constitutes the unhardened, warm water soluble light-sensitive layer adapted to form a hardened, water-insoluble relief image. Preferably, the ratio of the synthetic polymeric material to the hydrophilic colloid, is between about 1:1 and 6:1.

This invention relates to a process for the manufacture of etching resists and to photographic stripping films for use in such process.

It is generally known to produce etching resists for making gravure plates or cylinders from a light-sensitive photographic stripping film comprising in order a flexible support, a stripping layer, a flexible membrane and an unhardened light-sensitive layer in which a hardened water-insoluble image can be produced. After the said image has been formed the said stripping film is applied with its light-sensitive side to the surface to be etched, whereupon the flexible support is stripped off, the flexible membrane is removed and the remaining part of the stripping film is treated with a liquid that develops the hardened water-insoluble relief image constituting the etching resist.

The composition of the photographic stripping films as described is rather complex, the more so, since in some particular embodiments at least one layer must be provided between the flexible membrane and the light-sensitive layer in order to make possible a complete and easy removal of the flexible membrane.

Stripping films having such a complex composition cause many problems as to their manufacture; moreover, for the removal of the said flexible membrane a certain skill of the operator is required.

It has now been found that it is possible to produce etching resists for making gravure plates or cylinders in a much simplified way and with a better reliability by using a photographic stripping film comprising a flexible support, which is releasably and directly, i.e. without any intermediate layer, joined to a water-permeable layer, hereinafter called the colloid-latex layer, which colloid-latex layer has been applied from an aqueous solution of a hydrophilic colloid to which a polymeric latex or hydrosol has been added, said colloid-latex layer or another layer provided thereon constituting the unhardened light-sensitive layer in which a hardened water-insoluble image can be formed. In the case the colloid-latex layer itself constitutes the unhardened light-sensitive layer, it must not only be water-permeable, but also soluble in warm water when in unhardened state. In the case a separate, unhardened, light-sensitive layer is provided on said colloid-latex layer, the composition of the stripping film must be such that during the production of said hardened water-insoluble image no anchoring that is insoluble in warm water, is created between said hardened image and the colloid-latex layer, at least when the latter layer is not soluble in warm water. When the colloid-latex layer does dissolve in warm water, the creation of such anchoring entails no difficulties on the formation of an etching resist of good quality. By "layer that dissolves (or is soluble) in warm water" is understood in the present invention a layer which, on treating with warm water, is washed away in the form of a real solution, a colloidal solution or a more or less flocculent solution.

According to the present invention the process for the production of an etching resist from a light-sensitive stripping film as described comprises the consecutive steps of:

exposing the light-sensitive stripping film whereby or whereafter a hardened water-insoluble image is formed in the light-sensitive layer,
applying said stripping film with its emulsion side to the metal surface to be etched, which has been wetted previously with a liquid that has but a reduced swelling action on the hydrophilic colloids of the layers applied to the light-sensitive side of the stripping film,
stripping off the flexible support, and
developing the hardened water-insoluble relief image.

This invention is concerned with the above process for producing etching resists as well as with some particular photographic light-sensitive stripping films for use in said process.

A preferred photographic light-sensitive stripping film for use in the process of the invention comprises in order a flexible support, a colloid-latex layer that is soluble in warm water, and a light-sensitive unhardened tanning-developable silver halide emulsion layer, a suitable antihalation dye or pigment being present in one of the composition layers subjacent the silver halide emulsion layer. Between the silver halide emulsion layer and the colloid-latex layer a separatory hydrophilic colloid layer that is soluble in warm water is generally applied which separatory layer prevents contact hardening of the colloid-latex layer when tanning-developing the unhardened silver halide emulsion layer and thus facilitates developing of the hardened water-insoluble relief-image on the metal surface. When using such separatory layer it is no longer necessary for the colloid-latex layer to be soluble in warm water; it suffices that it is water-permeable. A colloid-latex layer that is merely water-permeable and not soluble in water suffices also when it is not hardenable on tanning-developing the silver halide emulsion layer.

As support for the light-senstive stripping film a flexible conventional film support of a hydrophobic synthetic material is preferably used. Suitable synthetic materials are for instance cellulose esters such as cellulose triacetate, cellulose acetopropionate and cellulose acetobutyrate, polymers such as polyvinyl chloride, polyvinyl acetate, popoly(vinyl chloride/vinyl acetate) and polystyrene, polyester such as polyethylene terephthalate, polybisphenol esters of aliphatic and/or aromatic dicarboxylic acids and polyesters of the polycarbonate type, polyamides and polyester amides. In order to improve the physical properties such as the dimensional stability of a support of a hydrophobic synthetic material, e.g. of one of the above-mentioned materials, all kinds of ingredients may be incorporated into said support and/or said support may be subjected to generally known treatments, such as stretching in one or both directions, according to the nature of the hydrophobic synthetic support. The thickness of the flexible support for use in a stripping film according to the invention is strongly dependent on the nature of the material from which it is made. In general, however, i.e. for the supports that are mostly used such as cellulose triacetate and polyethylene terephthalate supports, this thickness is comprised between about 50 and about 200 microns.

Directly to said flexible support, i.e. without applying first an intermediate stripping layer, the colloid-latex layer is applied. As already stated above, the colloid-latex layer is applied from an aqueous solution of a suitable hydrophilic colloid to which a polymeric latex or hydrosol has been added.

Gelatin may be particularly mentioned as suitable hydrophilic colloid but other proteins such as albumin as well as synthetic hydrophilic colloids such as polyvinyl alcohol and mixtures of two or more hydrophilic colloids are also suitable.

By polymeric latex or hydrosol is understood an aqueous dispersion of a synthetic polymer. Examples of suitable aqueous dispersions are aqueous dispersions of polystyrene and copolymers of styrene, for instance with ethyl acrylate; polyalkyl acrylates, such as polyethyl acrylate and poly-n-butyl acrylate, and copolymers of alkyl acrylates for instance with alkyl methacrylates, such as methyl methacrylate, vinyl alkyl ethers such as vinyl isobutyl ether, and acrylonitrile; polyalkyl methacrylates, such as polymethyl methacrylate and poly-n-butyl methacrylate; polyvinyl chloride and copolymers of vinyl chloride for instance with vinyl acetate, ethyl acrylate and diethyl maleate; polybutadiene and copolymers of butadine for instance with acrylonitrile, methyl methacrylate and styrene; polyvinylidene chloride and copolymers of vinylidene chloride for instance with alkyl acrylates, vinyl chloride and acrylonitrile; polyvinyl acetate and copolymers of vinyl acetate for instance with butylacrylate, dibutyl maleate and vinyl laurate. All these latices or hydrosols can be prepared according to generally known techniques by emulsion polymerization or by simply dispersing in water existing polymers in the presence of emulsifying agents. Other ingredients can also be added such as post-stabilizers and plasticizers. According as the polymer latex is obtained by emulsion polymerization of monomers or by dispersing in water existing polymers the particle size can vary within wide limits. This particle size is, however, not critical for the present invention. Suitable polymeric latices or hydrosols are commercially available under various names.

The ratio of synthetic polymer and hydrophilic colloid in the colloid-latex layer is dependent on the one hand on the requirements that the said layer should meet and on the other hand on the specific materials used in each particular case such as the nature of the layers in direct contact with the colloid-latex layer, the nature of the polymeric latex and of the hydrophilic colloid, and the presence of ingredients such as plasticizers, emulsifying agents, moistening agents, pigments, dyes, etc. in one or more of the layers of the light-sensitive stripping material. As regards the requirements which the colloid-latex layer should meet there should be remarked first that the adhesion to the flexible support must be sufficient to permit processing of the photographic stripping film without getting loose from the flexible support prematurely; the adhesion may not be too strong, however, so that, after application of the stripping film to the metal gravure plate or cylinder, the flexible support can be clearly removed by stripping from the colloid-latex layer. Moreover, in some cases the colloid-latex layer should not only be water-permeable but also soluble in warm water. From the foregoing it will be immediately clear for one skilled in the art that the ratio of synthetic polymer to hydrophilic colloid is different for each specific case and should be sought for experimentally. In the case the flexible support is a usual hydrophobic flexible film support for instance a cellulose triacetate or a biaxially stretched polyethylene terephthalate support, said ratio of synthetic polymer to hydrophilic colloid is mostly comprised between about 1/1 and about 6/1 when the colloid-latex must only be water-permeable. A ratio higher than 6/1 will, in most cases, cause too strong an adhesion of the flexible support to the colloid-latex layer. When the colloid-latex layer must be soluble in warm water said ratio will mostly be comprised between about 1/2 and 2/1. Ratios lower than 1/2 will generally result in too weak an adhesion.

The colloid-latex layer mostly comprises in addition to the polymeric latex and the hydrophilic colloid still other substances.

Among these substances the plasticizers should be mentioned in the first place. Said plasticizers are often already present in the commercially available polymeric latices. These plasticizers are of importance here on the one hand to keep the colloid-latex layer flexible and on the other hand to adjust the adhesion of the colloid-latex layer to the flexible support. These plasticizers are preferably present in an amount comprised between about 5 g. and about 100 g. per 100 g. of synthetic polymer and hydrophilic colloid together. Examples of particularly suitable plasticizers are esters of ethylene glycol such as tri(ethylene glycol)di(2-ethylbutyrate) and poly(ethylene glycol)di(2-ethylhexoate), esters of glycerol such as glycerol triacetate and glycerol tributyrate, phthalic acid esters such as dibutylphthalate, dioctylphthalate, di(methylglycol)phthalate, esters of glycolic acid such as alkylphthalyl alkyl glycolates, toluene sulphonamides such as p-toluene sulphonamide and N-substituted toluene sulphonamides, etc. Many suitable plasticizers among others those mentioned above are commercially available under various trade names.

The compatibility of the plasticizers with the coating composition of the colloid-latex layer can be considerably improved by incorporating emulsifying agents in said composition. These emulsifying agents are mostly added to the polymeric latex or hydrosol, at least when they are not yet present wherein as in the case with many commercially available polymeric latices.

The colloid-latex layer may further comprise all kinds of other ingredients such as moistening agents, i.e. hygroscopic substances such as glycerol, glucose and sorbitol, water-soluble salts that make it easier to strip the colloid-latex layer from the flexible support, pigments and dyes.

For the application of the colloid-latex layer to the flexible support the following procedure is generally followed: plasticizer is added under strong agitation to the polymeric latex whereupon the dispersion is mixed in the intended ratio with an aqueous solution of a suitable hydrophilic colloid such as gelatin. Occasional further ingredients such as antihalation dyes or pigments may be added before as well as after the said mixing. The colloid-latex coating composition is preferably applied to the flexible support in such a way that after having been dried the colloid-latex layer has a thickness comprised between about 1 and about 15 microns.

The antihalation pigments or dyes are preferably incorporated into the colloid-latex layer although they may also be present in another layer subjacent the silver halide emulsion layer. The dyes used are preferably fast to diffusion. It is also not unusual to incorporate the antihalation dye or pigment into a backing layer in the case the flexible support is transparent. The concentration in which the antihalation dyes or pigments are present is mostly as conventionally applied for an antihalation action and generally known by those skilled in the art.

As already stated above it is necessary to provide a separatory hydrophilic colloid layer that is soluble in warm water between the unhardened tanning-developable silver halide emulsion layer and the colloid-latex layer if the latter is hardenable on tanning development of the silver halide emulsion layer and at the same time not soluble in warm water. When the colloid-latex layer does dissolve in warm water and/or the colloid-latex layer is not hardenable on tanning development of the silver halide emulsion layer, such separatory layer is not necessary but is generally beneficial in practice.

A suitable separatory layer is for instance a gelatin layer or a thin unhardenable colloid layer as described and claimed in United Kingdom patent specification Ser. No. 1,035,441. The separatory layer may also comprise minor amounts of plasticizer, as well as all kinds of other ingredients such as emulsifying agents, moistening agents, antihalation dyes or pigments, etc. Suitable plasticizers are among others synthetic polymers applied from polymeric latices such as those described above for being used in the preparation of the colloid-latex layer.

The light-sensitive silver halide emulsion layer to be applied to the colloid-latex layer, to the said separatory layer or to still another supplementary intermediate layer that is soluble in warm water is a tanning-developable, preferably gelatino silver halide emulsion layer which is substantially free of hardening agents for the binder thereof. In other words it is a light-sensitive silver halide emulsion layer of the type usually applied for the preparation of etching resists and generally known by those skilled in the art; so that it is not necessary to enter into detail on it. The light-sensitive silver halide emulsion layer may occasionally be composed as described and claimed in French patent specification 1,405,876. The light-sensitive layer further contains preferentially a certain amount of plasticizer for the binder of this layer. Suitable plasticizers are among others synthetic polymers applied from polymeric latices as those described above for being used in the preparation of the colloid-latex layer.

The light-sensitive silver halide stripping film may still contain other layers than those described already in detail above. Among these may be particularly mentioned one or more conventional backing layers, e.g. with antistatic properties or having an antihalation action, and a common very thin antistress or protective layer such as a thin gelatin layer which is coated on top of the light-sensitive layer. Said antistress layer may occasionally have a slight surface roughness to prevent the formation of Newton's rings, said roughness being created by distributing homogeneously in said layer particles that protrude from the light sensitive material.

For the preparation of the etching resist a light-sensitive photographic stripping film of a composition as described above is first of all exposed. This exposure may occur in any usual and generally known way to expose a photographic stripping film for preparing etching resists. For instance said exposure may be an exposure to a screen followed by an exposure to a continuous tone original or vice versa, or an exposure to a laterally dotted half-tone transparency.

After the exposure the film is tanning-developed in the usual way, rinsed, fixed, rinsed again and dried.

After these treatments the stripping film is applied with its emulsion side to the metal surface to be etched, this surface generally being a copper plate or a cylinder with copper surface plate. In order to assure a firm overall contact between film and surface to be etched, even after having stripped off the flexible support, the said surface to be etched is wetted previously with a liquid that has but a reduced swelling action on the hydrophilic colloids of the layers applied to the light-sensitive side of the stripping film. By "reduced swelling action" is meant that said liquid makes the said hydrophilic colloids swell less than pure water does. Examples of such liquids are e.g. mixtures of water and at least one water-miscible organic solvent such as methanol, ethanol, isopropanol, diacetone alcohol and aceton, the organic solvent constituting preferably at least about 20% by volume and at most about 80% by volume of the total amount of mixture, and aqueous solutions of inorganic and organic salts as generally known by those skilled in the art. Suitable inorganic salts are e.g. sodium sulphate and ammonium sulphate; suitable organic salts for the case wherein the hydrophilic colloid of the layers applied to the light-sensitive side of the stripping film consists essentially of gelatin, which case is a preferred embodiment, are aromatic and long-chain aliphatic compounds carrying sulphonic acid groups, which compounds are applied from acid aqueous solutions.

Once the photographic stripping film is present on the metal surface to be etched the flexible support of the film is removed by stripping it off. The separation occurs between the flexible support and the colloid-latex layer so that the latter now constitutes the top-layer of the part of the stripping film that remains on the metal plate to be etched.

The hardened water-insoluble relief image is now developed by treating the remaining part of the stripping film with a suitable liquid that is preferably warm water the temperature of which is mostly comprised between about 30 and about about 70° C. Other suitable liquids are liquids comprising proteolytic enzymes for the unhardened hydrophilic colloids used in the preparation of the stripping film, and peptizing solutions for said colloids. Suitable gelatin peptizing solutions are e.g. aqueous solutions of ammonium bromide, sodium salicylate, potassium thiocyanate and urea.

After the relief image has been dried, the gravure plate may be prepared in the usual way, i.e. by etching through the etching resist obtained with conventional etching liquids such as concentrated iron(III)chloride solutions and by removing thereupon the etching resist.

In the case the colloid-latex layer is only water-permeable and not soluble in warm water, i.e. in the case the colloid-latex layer constitutes so to say a matrix of synthetic polymer in which the hydrophilic colloid is dispersed, this layer will get loose during the said development of the hardened water-insoluble relief image as a coherent membrane for the reason that the liquid penetrates through said layer and dissolves the colloid which is present between the tanning developed image and the colloid-latex layer.

In the case the colloid-latex layer is not only water-permeable but also soluble in warm water, i.e. in the case the colloid-latex layer constitutes so to say a matrix of hydrophilic colloid in which the synthetic polymer is dispersed without forming itself a coherent matrix, the layer will be removed during the said development of the hardened water-insoluble relief image in the form of a colloidal or a more or less flocculent solution.

According to the invention the light-sensitive layer can also be a dichromate-sensitized layer that comprises an unhardened hardenable hydrophilic colloid and a pigment. Such dichromate-sensitized layers are generally known in the art of making etching resists for photogravure printing plates, so that it is not necessary to enter into detail on them. In the case a dichromate-sensitized light-sensitive layer is used said layer comprises preferably an amount of plasticizer, e.g. of the type as identified above for being incorporated in the unhardened tanning developable silver halide emulsion layers. Further, the stripping films, which have a dichromate-sensitized layer and are intended for use according to the present invention, are of the same composition as described above for stripping films with an unhardened tanning-developable silver halide emulsion layer with the difference that no antihalation dye or pigment must be present and that in principle no separatory layer is necessary between the light-sensitive layer and the colloid-latex layer even when the latter is only water-permeable and not soluble in warm water, provided, however, that the dichromate-sensitized layer is sufficiently thick to prevent the hardening from penetrating to the colloid-latex layer. In the case of a dichromate-sensitized layer there is no need for a tanning-development; the image-wise hardening is caused by the exposure itself. The further procedure to obtain an etching resist occurs along the lines as described above for stripping films with a silver halide emulsion layer.

Any other unhardened light-sensitive layer, in which a hardened, water-insoluble image can be formed on exposure or after said exposure and the unhardened areas of which can be dissolved in warm water, is suitable for use according to the present invention instead of an unhardened tanning-developable silver halide emulsion layer or a dichromate-sensitized layer as described above.

According to the invention it is also not necessary that the light-sensitive layer is provided as separate layer on top of the colloid-latex layer. As already stated above it is also possible that the latter layer itself constitutes the unhardened light-sensitive layer in which a hardened water-insoluble image can be produced. In this case, however, the colloid-latex layer should be such that it is soluble in warm water when in unhardened state.

The following are some examples illustrating the process and photographic stripping film of the invention.

EXAMPLE 1

(1) Preparation of the light-sensitive photographic stripping film

The two dispersions A and B from which the colloid latex coating will be composed are prepared as follows:

Dispersion A.—58 cc. of an aqueous dispersion of a copolymer of vinylidene chloride and acrylonitrile (85/15 by weight) comprising 52 g. of said copolymer per 100 cc. of dispersion and also containing dibutyl phthalate in an amount of 15% by volume of the dispersion is mixed with 19 cc. of water and 12 cc. of a 15% aqueous solution of a wetting agent with the following formula:

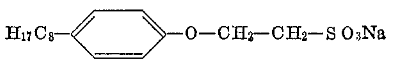

Whilst vigorously stirring 10 cc. of dioctyl phthalate are added, whereupon the dispersion is kept at room temperature for 24 hours.

Dispersion B.—1.8 g. of the pigment Litholscharlach BBM Colanyl Teig. (C.I. 15,865 Lake) in 60 cc. of water is added to 30 cc. of a solution of 10 g. of gelatin in 100 cc. of water at 35° C.

7 cc. of dispersion A and 1.5 cc. of a mixture of glycerol and water (50/50) are added to dispersion B while stirring. In this way the colloid latex coating composition is obtained.

This coating composition is applied, at 33° C. and pro rata of 50 g. of coating composition per sq. m., to an unsubbed cellulose triacetate film support having a thickness of 140 micron. The colloid-latex layer thus obtained is soluble in warm water.

On top of this colloid-latex layer a light-sensitive tanning-developable silver halide emulsion layer is coated at 35° C. and pro rata of 180 g. of light-sensitive coating composition per sq. m. of film material.

The light-sensitive coating composition is obtained by mixing 95 cc. of Emulsion I (the composition of which is given hereinafter) with 30 cc. of water and 40 cc. of a 40% polyethylacrylate latex.

Emulsion I is a gelatino silver bromo-iodide emulsion (0.66 mol percent of iodide) comprising 93 g. of gelatin per kg. In the preparation of said emulsion the ratio of gelatin to silver nitrate was 2.15. The emulsion also comprises per kg. 20 mg. of an ortho-chromatic sensitizer and 2.5 g. of a yellow screening dyestuff. The emulsion further comprises the usual ingredients such as stabilizers and moistening agents.

Finally there is applied at 32° C. and pro rata of 40 g. of coating composition per sq. m. an antistress layer on top of the light-sensitive layer from a 1.5% aquous gelatin solution comprising 0.2% of sodium tetradecyl sulphate.

(2) Preparation of the etching resist

By means of a Tungsten lamp of 25 watt the light-sensitive photographic stripping film described above is exposed successively to a screen through a yellow filter and to a transparency through a U.V.-filter.

The light-sensitive photographic stripping film so exposed is dipped for 3 minutes in the following solution containing developing compounds:

Water—1000 cc.
Potassium metabisulphite—3 g.
Sodium sulphite—5 g.
Potassium bromide—2 g.
1-phenyl-3-pyrazolidinone—0.3 g.
Pyrogallol—7 g.

whereupon it is dipped for 3 minutes in an activator bath which is a 5% aqueous solution of sodium carbonate.

The tanning-developed photographic stripping film is then rinsed for 1 minute in water, fixed for 5 minutes in a fixing bath of the following composition:

Water—1000 cc.
Sodium thiosulphate 5 aqua—200 g.
Potassium metabisulphite—25 g.

and rinsed again in water for 10 minutes.

Finally the photographic stripping film is wetted with a 1% aqueous solution of gylcerol whereupon it is dried.

The photographic stripping film is now transferred to a copper plate which has been previously wetted with 70% aqueous ethanol. Then the cellulose triacetate support is stripped off and the hardened relief image is developed by washing for 10 minutes with water of 45° C. After having been dried an etching resist is obtained through which the copper plate can be etched in the usual way by means of iron(III)chlorice solutions, whereby a photogravure printing plate of excellent quality remains once the etching resist is removed.

EXAMPLE 2

(1) Preparation of the light-sensitive photographic stripping film 70 cc. of an aqueous dispersion of a copolymer of butadiene and acrylonitrile (80/20) which contains free carboxyl groups and is present in an amount of 41 g. per 100 cc. of dispersion, is mixed with 17.5 cc. of water and 12.5 cc. of a 14% aqueous solution of a wetting agent having the following formula:

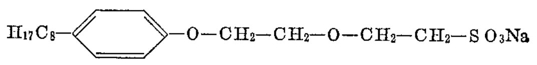

The dispersion obtained is called hereinafter Dispersion C.

30 cc. of a solution of 10 g. of gelatin in 100 cc. of water is mixed at 35° C. with 37.5 cc. of water, 17.5 cc. of Dispersion C and 15 cc. of a 2.5% aqueous solution of a purple violet dye.

The colloid-latex coating composition thus obtained is applied pro rata of 66 g. per sq. m. to the smooth side of a one-sidely matted polycarbonate film support. The colloid-latex layer thus obtained is a water-permeable layer which is, however, not soluble in warm water.

To this colloid-latex layer there is applied at 33° C. a separatory hydrophilic colloid layer that is soluble in warm water. This separatory layer is coated pro rata of 70 g. per sq. m. from the following coating composition which is prepared at 35° C.:

| | Cc. |
|---|---|
| Aqueous solution of gelatin (10%) | 30 |
| Water | 47 |
| Polyethylacrylate latex (40%) | 15 |
| Sulphonated castor oil | 0.3 |
| Aqueous solution of glucose (20%) | 6 |

The separatory layer is coated with a tanning-developable light-sensitive silver halide emulsion layer that is free of hardener pro rata of 166 g. of light-sensitive coating composition per sq. m. of film material.

The light-sensitive coating composition is obtained by mixing 80 cc. of Emulsion II (the composition of which is given hereinafter) with 17 cc. of water, 20 cc. of a 35% polyvinyl acetate latex and 3 cc. of a mixture of glycerol and water (50/50).

Emulsion II is obtained by mixing 3 parts by weight of a silver chloro-iodide emulsion with 1 part by weight of a silver bromo-iodide emulsion, both emulsions being composed as given hereinafter, and by adding to the mixture of emulsions obtained the usual emulsion ingredients such as stabilizers and moistening agents.

The silver chloro-iodide emulsion used is a hard orthochromatic gelatin silver chloro-iodide emulsion comprising 0.6 mole percent of iodide and 95 g. of gelatin per kg. of emulsion; the ratio of gelatin to silver nitrate in the preparation of this emulsion is 2.54.

The silver bromo-iodide emulsion used is a soft blind gelatin silver bromo-iodide emulsion comprising 0.7 mole percent of iodide and 65 g. of gelatin per kg. of emulsion; the ratio of gelatin to silver nitrate in the preparation of said emulsion is 1.05.

(2) Preparation of the etching resist

The etching resist is prepared in an analogous way as described in Example 1 with the only difference that before transferring the dried tanning-developed photographic stripping film to the copper plate to be etched said plate is wetted with a mixture of isopropanol and water (50/50) instead of with aqueous ethanol. In this case too, an excellent photogravure printing plate is obtained on etching the copper plate through the etching resist in the usual way.

EXAMPLE 3

To a usual biaxially stretched polyethylene terephthalate film support there is applied a colloid-latex layer which constitutes at the same time the light-sensitive tanning-developable silver halide emulsion layer. This colloid-latex layer is applied from a coating composition obtained by mixing at 35° C., 95 cc. of Emulsion I (described in Example 1) with 22 cc. of water, 25 cc. of Dispersion A (described in Example 1) and 2 cc. of sorbitol. This coating composition is coated at 35° C. and pro rata of 120 g. per sq. m. The light-sensitive colloid-latex layer thus obtained is dried at 36° C. and at 40% of relative humidity.

Then the light-sensitive photographic stripping film is exposed through a yellow filter to a laterally dotted halftone transparency as is usual in the preparation of intaglio printing plates.

The exposed light-sensitive material is tanning-developed and further treated in the same way as described in Example 1, with the only difference that the copper plate, is now wetted with a mixture of diacetone alcohol and water (25/75).

EXAMPLE 4

(1) Preparation of the light-sensitive photographic stripping film 70 cc. of an aqueous dispersion of a copolymer of butadiene and acrylonitrile (60/40 by weight) which copolymer is present in an amount of 42 g. of copolymer per 100 cc. of dispersion, are mixed with 12 cc. of a 5% aqueous solution of the sodium salt of oleylmethyl tauride. Whilst strongly stirring 10 g. of dibutylphthalate are added whereupon the mixture is stirred for another 30 min. and then allowed to stand for 24 hours (Dispersion D).

To 30 cc. of a 10% aqueous solution of gelatin 10 cc. of water and 20 cc. of Dispersion D are added.

The colloid-latex coating composition thus obtained is applied pro rata of 66.5 g. per sq. m. to a non-subbed biaxially stretched polyethylene terephthalate film support provided at its back-side with a carbon black antihalation layer, which is soluble in an alkaline treating bath.

To the colloid-latex layer thus obtained, which is not soluble in warm water, there is applied a hydrophilic colloid separatory layer which is soluble in warm water. This separatory layer is applied pro rata of 60 g. per sq. m. from a dispersion obtained by mixing together 30 cc. of a 10% aqueous gelatin solution, 40 cc. of water and 5 cc. of Dispersion D.

This separatory layer is overcoated with a light-sensitive tanning-developable silver halide emulsion layer from a coating composition obtained by mixing 80 cc. of Emulsion II (described in Example 2) with 20 cc. of 25% aqueous solution of glucose, which coating composition is applied pro rata of 66 g. per sq. m.

Finally, an antistress layer as described in Example 1 is coated on top of the light-sensitive emulsion layer.

(2) Preparation of the etching resist

The etching resist is prepared in the same way as described in Example 1, with the only difference that the copper plate now is wetted with a mixture of acetone and water (50/50) in order to obtain a good over-all adhesion of the photographic stripping film to the copper plate.

EXAMPLE 5

(1) Preparation of the photographic stripping film

A water-permeable colloid-latex layer which is not soluble in warm water, is prepared as described hereinafter.

24 g. of gelatin is caused to swell in 460 cc. of water at 20 to 25°. After 2 hours the composition is heated at 40° C. whereby the gelatin becomes dissolved. To this solution is added a dispersion of 25 g. of the pigment Litholscharlach (see Example 1) in 180 cc. of water and 480 cc. of a 30% latex of a copolymer of 80% by weight of vinylidene chloride, 10% by weight of methyl acrylate and 10% by weight of ethyl acrylate. From the dispersion thus obtained there is applied pro rata of 55 g. per sq. m. a layer to a non-subbed biaxially stretched conventional polyethylene terephthalate film support, which is provided at its back-side with a subbing layer and a gelatin layer of a thickness of 5 microns.

The colloid-latex layer is overcoated with a separatory hydrophilic colloid layer that is soluble in warm water. This layer is applied from the following coating composition pro rata of 50 g. per. sq. m.:

Water—600 cc.
25% aqueous gelatin solution—100 cc.
Polyvinyl pyrrolidone—3 g.
20% aqueous solution of cane sugar—80 cc.
5% aqueous solution of saponin—20 cc.

On this separatory layer a same light-sensitive silver halide emulsion layer as described in Example 4 is coated.

Finally, a very thin antistress layer is coated on top of the light-sensitive layer from the following coating composition, which is applied at a rate of 33 g. per sq. m.:

Water—100 cc.

Gelatin—1.5 g.

Aluminum oxide grains with a maximum diameter of 10 microns—0.5 g.

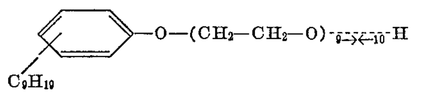

2 cc.

5% aqueous saponin—10 cc.

(2) Preparation of the etching resist

The preparation occurs in the same way as described in Example 1, with the only difference that in this case the copper plate is wetted before application of the stripping film with a mixture of diacetone alcohol, isopropanol and water (30/20/50).

EXAMPLE 6

(1) Preparation of the photographic stripping film 24 g. of gelatin are dissolved in 664 cc. of water at 45° C. This solution is mixed with the following composition:

| | Cc. |
|---|---|
| Latex (30%) of a copolymer of 80% by weight of vinylidene chloride, 10% by weight of methyl acrylate and 10% by weight of ethyl acrylate | 400 |
| Mixture of glycerol and water (50/50) | 12 |

After de-aeration and cooling to 35° C. the colloid-latex coating composition thus obtained is applied pro rata of 50 g. per sq. m. to a non-subbed biaxially stretched common polyethylene terephthalate film support having a thickness of 180 microns. The colloid-latex layer is water-permeable but not soluble in warm water.

For the preparation of the coating composition of the pigment layer 165 g. of gelatin of low viscosity are dissolved in 500 cc. of water at 50° C., and the solution obtained is mixed with the following composition:

| | Cc. |
|---|---|
| Aqueous dispersion of iron(III)oxide (20%) | 200 |
| Water | 300 |
| Glycerol | 15 |
| Polyethyl acrylate latex (20%) | 400 |

After de-aeration and cooling to 43° C. the coating composition thus obtained is applied pro rata of 250 g. per sq. m. to the colloid latex layer, whereafter the layer obtained is dried at 28° C.

(2) Preparation of the etching resist

The photographic stripping film prepared as described in point 1 is dichromate-sensitized by immersing it for 3 minutes in a 4% aqueous solution of potassium dichromate. Thhe excess of liquid is scraped off and the light-sensitive stripping film obtained is dried at room temperature in the dark.

The dichromate-sensitized stripping film is successively exposed to a screen and to a continuous tone original in the way commonly applied for dichromate-sensitized material for making etching resists.

The exposed stripping film is transferred to a copper plate which has been wetted previously with 60% aqueous ethanol. About 1 minute later the polyethylene terephthalate film support is stripped off and the hardened relief image is developed by washing with water of 40° C. The colloid-latex layer detaches as a coherent membrane. After having been dried an etching resist is obtained through which the copper plate can be etched in the usual way which results in the formation of a photogravure printing plate of excellent quality.

What we claim is:

1. Process for producing an etching resist comprising the consecutive steps of:

forming by steps including exposure to a light image a hardened water-insoluble image corresponding to the light image in the light-sensitive layer of a photographic stripping film which essentially comprises (a) a hydrophobic flexible film support, (b) directly and releaseably joined to said support a further layer consisting essentially of a mixture in the range of proportions of about 1:0.5–6 of a hydrophilic colloid and the residue of an aqueous dispersion of a water-insoluble synthetic polymer, and (c) an unhardened light-sensitive layer soluble in warm water in which a hardened, water-insoluble relief image can be formed;

wetting the metal surface to be etched with a liquid having a swelling action for hydrophilic colloids less than that of pure water;

applying to the metal surface said stripping film with said hardened, water-insoluble image formed therein with its light-sensitive layer side facing the metal surface to be etched while said surface remains wet with said liquid;

removing the flexible film support by stripping; and developing the hardened, water-insoluble relief image with a developing liquid capable of dissolving any anchor existing between said light-sensitive emulsion layer and said further layer, and drying the resultant relief image.

2. A process according to claim 1, wherein the light-sensitive layer is a tanning developable silver halide emulsion layer, an antihalation dye or pigment being present in a layer subjacent the silver halide emulsion layer, said colloid-latex layer being water-insoluble but water-permeable and resistant to hardening on tanning development of said silver halide emulsion layer or soluble in warm water.

3. A process according to claim 2, wherein a hydrophilic colloid intermediate layer that is soluble in warm water is present between the colloid-latex layer and the light-sensitive silver halide emulsion layer.

4. A process according to claim 1, wherein the light-sensitive layer is a tanning-developable silver halide emulsion layer joined to a colloid-latex layer that is water-insoluble, water permeable and hardenable on tanning development of said silver halide emulsion layer by means of a hydrophilic colloid intermediate layer that is soluble in warm water, an antihalation dye or pigment being present in a layer subjacent the silver halide emulsion layer.

5. A process according to claim 1, wherein a plasticizer is present in at least one of said colloid-latex layer and light-sensitive layer.

6. A process according to claim 2, wherein a plasticizer is present in at least one of said colloid-latex layer and light-sensitive layer.

7. A process according to claim 3, wherein a plasticizer is present in at least one of said colloid-latex layer, said light-sensitive layer, and said intermediate layer.

8. A process according to claim 4, wherein a plasticizer is present in said colloid-latex layer, said light-sensitive layer, and said intermediate layer.

9. A process according to claim 4, wherein the ratio of synthetic polymer to hydrophilic colloid in the colloid-latex layer is comprised between about 1/1 and about 6/1.

10. A process according to claim 1, wherein the metal surface to be etched is wetted with a mixture of water and at least one water-miscible organic solvent before the stripping film carrying said hardened water-insoluble relief image is applied thereto.

11. A process according to claim 10, wherein the water-miscible organic solvent constitutes from about 20 to about 80% by volume of the total amount of mixture with which the metal surface to be etched is wetted.

12. A process according to claim 1, wherein the hardened water-insolublie relief image is developed by applying warm water, having a temperature comprised between about 30° C. and about 70° C., to the remaining part of the stripping film after the film support has been removed by stripping.

13. Process for the production of an etching resist comprising the consecutive steps of:

forming by steps comprising exposure to a light image a hardened water-insoluble image corresponding to the light image in the light-sensitive layer of a photographic stripping film which essentially comprises (a) a hydrophobic flexible film support, and (b) an unhardened light-sensitive layer soluble in warm water in which said hardened, water-insoluble relief image can be formed, said light-sensitive layer being releasably and directly joined to said support and comprising a mixture of a hardenable hydrophilic colloid and the residue of an aqueous dispersion of a synthetic polymer in which the ratio of colloid to polymer is about 1:0.5–2;

wetting the metal surface to be etched with a liquid having a swelling action for hydrophilic colloids less than that of pure water;

applying to the metal surface to be etched said stripping film with said hardened water-insoluble image formed therein with its light-sensitive layer side facing the metal surface while said surface remains wet with said liquid;

removing the flexible film support by stripping, and developing the hardened, water-insoluble relief image with a developing liquid capable of dissolving the unhardened light-sensitive layer and drying this relief image.

References Cited

UNITED STATES PATENTS

| | | | |
|---|---|---|---|
| 3,396,025 | 8/1968 | Guestaux et al. | 96—83 |
| 3,453,111 | 7/1969 | Yackel | 96—83 |
| 2,887,379 | 5/1959 | Blake et al. | 96—83 |
| 2,319,102 | 5/1943 | Albers et al. | 96—83 |
| 3,057,722 | 10/1962 | Alles | 96—83 |
| 3,142,568 | 7/1964 | Nottorf | 96—114 |
| 3,369,903 | 2/1968 | Harvey | 96—28 |

FOREIGN PATENTS

| | | | |
|---|---|---|---|
| 637,710 | 3/1962 | Canada | 96—83 |

NORMAN G. TORCHIN, Primary Examiner

J. E. CALLAGHAN, Assistant Examiner

U.S. Cl. X.R.

96—83; 101—34